United States Patent [19]

Ishibashi et al.

[11] 3,902,704

[45] Sept. 2, 1975

[54] EQUIPMENT FOR PREPARATION OF FOAMED POLYOLEFIN INSULATED WIRES FOR TELECOMMUNICATION CABLES

[75] Inventors: Masashi Ishibashi, Chiba; Hideo Suzuki, Sakwa, both of Japan

[73] Assignee: The Fujikura Cable Works, Ltd., Tokyo, Japan

[22] Filed: Jan. 14, 1974

[21] Appl. No.: 433,281

[30] Foreign Application Priority Data

Jan. 17, 1973 Japan.................................. 48-7519

[52] U.S. Cl.................................... 259/191; 259/25
[51] Int. Cl.²............................................ B29B 1/06
[58] Field of Search......... 259/191, 192, 193, 9, 10, 259/25, 26, 97, DIG. 18; 425/206, 207, 208, 209, DIG. 817; 100/145

[56] References Cited
UNITED STATES PATENTS

| | | | |
|---|---|---|---|
| 735,678 | 8/1903 | Ruger | 259/26 |
| 3,051,456 | 8/1962 | Clarke | 259/25 |
| 3,780,995 | 12/1973 | Burkle | 259/193 |

*Primary Examiner*—Robert W. Jenkins
*Attorney, Agent, or Firm*—Toren, McGeady and Stanger

[57] ABSTRACT

In an extruder for the preparation of foamed resin insulated wires for telecommunication cables such as coaxial cables, a passage for a blowing fluid is provided to extend through the central portion of the extruder screw in the axial direction and open in the low pressure zone of the extruder, and at least one nozzle is mounted on the screw surface or the side face of the flight in the low pressure zone of the extruder to inject into and mix with into a molten resin a blowing fluid forwarded under pressure through said passage. The foamed resin insulated wires produced by the equipment have excellent electric and mechanical properties, in which the insulating resin coating has very high mechanical strength even at a very thin thickness. Further, the extrusion coating speed can be much increased when the above equipment is employed.

13 Claims, 9 Drawing Figures

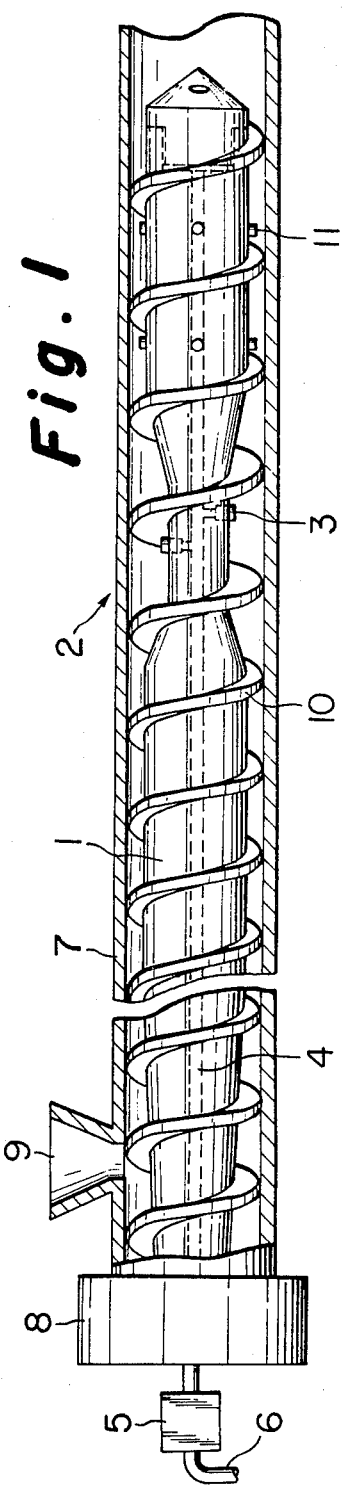

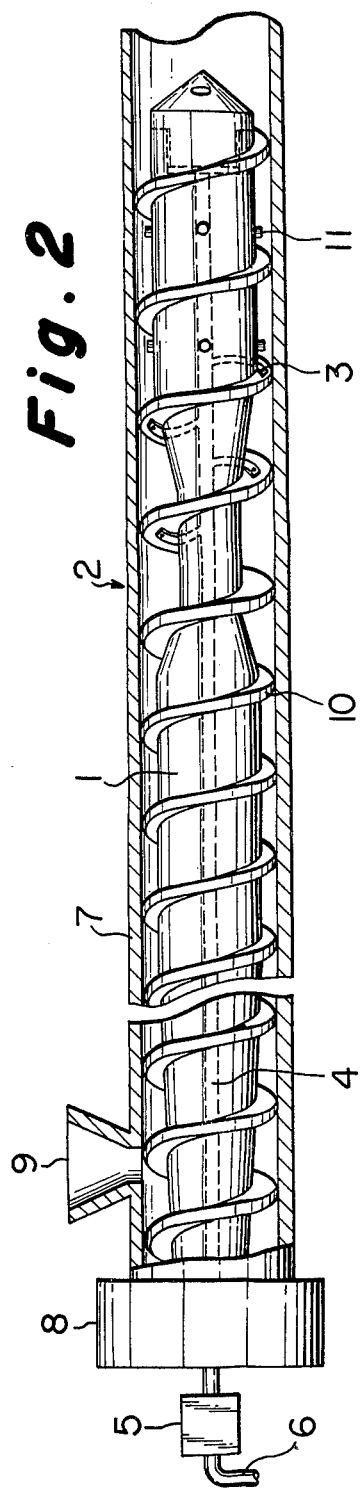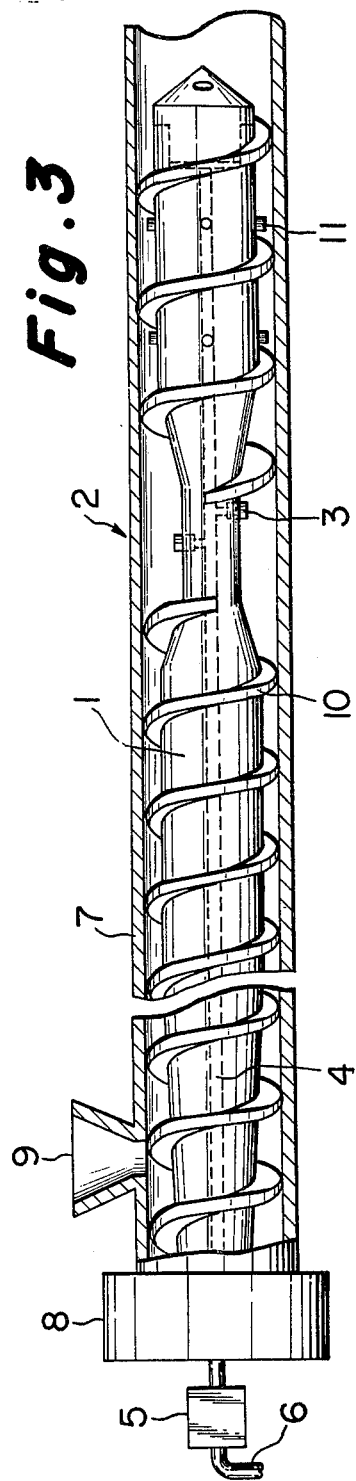

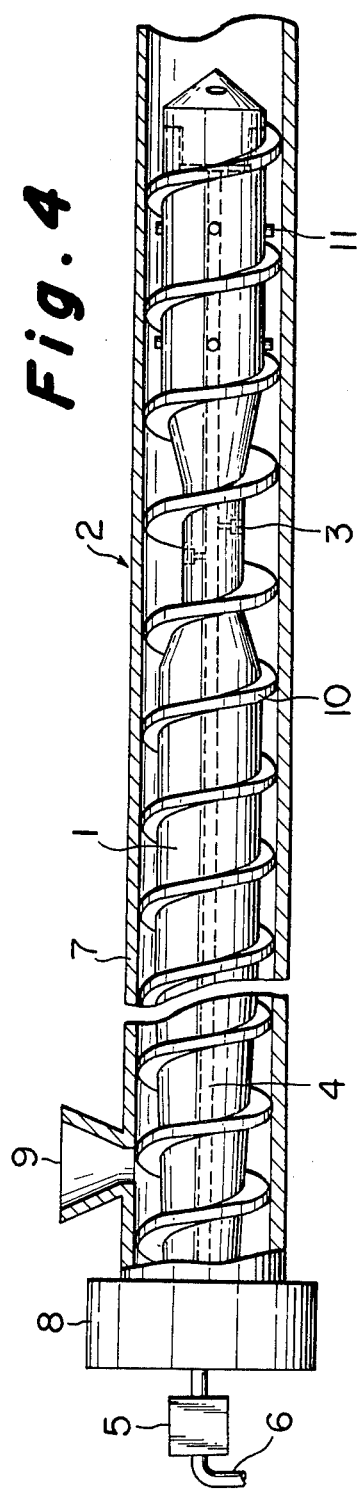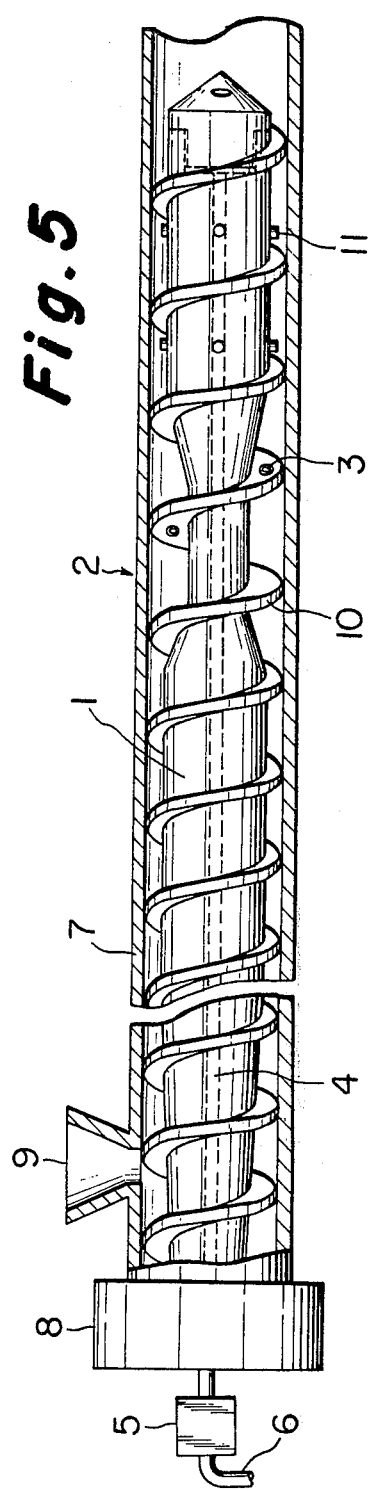

EQUIPMENT FOR PREPARATION OF FOAMED POLYOLEFIN INSULATED WIRES FOR TELECOMMUNICATION CABLES

FIELD OF THE INVENTION

This invention relates to an equipment, especially an extruder, for the manufacture of foamed polyolefin insulated wires for telecommunication cables.

BRIEF DESCRIPTION OF THE PRIOR ART

With recent tendency of band range frequency in telecommunication cables, reduction of loss in insulations of coaxial cables or the like is required more strictly than in the past. In foamed polyethylene insulated cables and similar insulated cables for city communication, insulations are required to be foamed insulations of a thin thickness and be excellent in the mechanical strength, especially the abrasion resistance. Such foamed polyolefin insulated wires are prepared by a method comprising mixing a polyolefin such as polyethylene with a blowing agent at a suitable mixing ratio, extruding the mixture on a conductor and causing the blowing agent to foam the polyolefin. However, this method involves the following defects:

1. In case a coating of foamed polyolefin layer having such a thin thickness as no more than 0.2 mm is formed on a fine conductor of a diameter no more than 0.5 mm, the conductor is frequently stretched and is sometimes broken.
2. Products obtained according to the above method have only a low mechanical strength, and cracks are readily formed under flexure.
3. In case blowing is accomplished only by chemical blowing agents, the decomposition product has bad influences on dielectric property of the insulation.

SUMMARY OF THE INVENTION

It is a primary object of this invention to provide an equipment for the preparation of foamed polyolefin insulated wires for telecommunication cables, which can overcome the foregoing defects involved in the conventional techniques and can produce insulated electric wires having a low dielectric constant and being excellent in the mechanical strength and abrasion resistance.

In accordance with the principal aspect of this invention, there is provided an equipment for the preparation of foamed polyolefin insulated wires for telecommunication cables, which comprises an extruder for producing a foamed polyolefin coating on a conductor, in which at least one nozzle is mounted on an opening end of a passage for a blowing fluid which extends through the central portion of the screw of the extruder in the axial direction and is opened on the screw surface or the side face of the flight in the low pressure zone of the extruder, and the blowing fluid is injected under pressure into a molten polyolefin from said nozzle and dispersed in the molten polyolefin.

In a prefered embodiment of the above equipment of this invention, the nozzle has a D/H ratio ranging from 0.1 to 2.0, in which H stands for the projection height of the nozzle and D designates the outside diameter of the nozzle.

BRIEF DESCRIPTION OF THE DRAWINGS

FIGS. 1, 2, 3, 4 and 5 are diagrams illustrating embodiments of the equipment of this invention.

FIG. 1 shows the equipment which has nozzles projecting from the periphery of the screw.

FIG. 2 shows the equipment which has nozzles projection on the side face of the flight.

FIG. 3 shows the equipment which has nozzles projection of the screw, the flight of which is partly cut off.

FIG. 4 shows the equipment which has nozzles mounted an opening of the screw.

FIG. 5 shows the equipment which has nozzles mounted an opening on the side surface of the flight.

Figure 6:
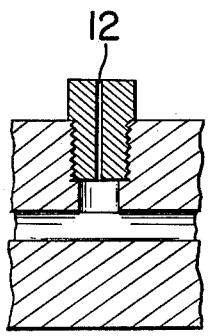
FIGS. 6, 7 and 8 are diagrams partially magnifying the part where the nozzles are installed.

Referential numerals 5, 6, 7, 8, 9, 10 and 11 in each figure denote, respectively, a rotary joint, a pipe, a cylinder, a drive device, a hopper, a flight and a mixing pin.

DETAILED DESCRIPTION OF THE INVENTION

In accordance with this invention, the central portion of a screw of an extruder of the known type is perforated, and a fluid of a blowing source is injected into a low pressure zone of the extruder from a nozzle mounted at an opening of the so perforated passage in the low pressure zone through a rotary joint by means of a pump, whereby the blowing fluid is dynamically mixed with a molten polymer and is well dispersed therein to form a foamed resin insulating layer.

When the equipment of this invention is employed, a variety of resins can be utilized for forming coatings on conductors varying in the diameter. Therefore, it is expected that the equipment of this invention can be applied broadly in various fields. Even in the case of a conductor of a large diameter of about 2.0 mm, if the insulating coating is formed with use of the equipment of this invention, the foaming state is very uniform throughout the insulating coating layer, and therefore, the mechanical and electric properties of the insulating coating layer can be further improved over the conventional products, with the result that the thickness of the insulating coating layer can be much reduced.

By the term "blowing fluid" used herein is meant gas (liquefied gas) having no bad influences on dielectric properties of the insulation, such as nitrogen gas, argon gas, propane gas and chlorofluoro hydrocarbon.

The equipment of this invention will now be illustrated detailedly by reference to the accompanying drawings.

In FIG. 1, 2, 3, 4, and 5, 1 represents a screw of a coating extruder, 2 indicates the low pressure zone of the extruder, and 3 designates one or more nozzles provided at the end of the opening on the surface of the screw or the side face of the flight in the low pressure zone; said opening is branched from a passage which perforates through the central portion of the screw 1 in the axial direction.

The nozzles are provided on surface of the screw as in FIG. 4 or on the side face of the flight as in FIG. 5.

The supply of the blowing agent through nozzles arranged in this manner works to increase the mixing and dispersing effects of the coating material with the rotation of the screw, compared to prior art in which the blowing agent is supplied through the cylinder body.

The nozzles are, however, more preferably provided in such a manner that they are projected on the surface of the screw or on the side face of the flight as shown in FIGS. 1 and 2 respectively.

This nozzle 3 is so arranged that the ratio of D/H is within a range of from 0.1 to 2.0, preferably 0.5 to 1.0, in which H designates the projection height and D indicates the outside diameter of the nozzle which is usually within a range of 3 to 10 mm. By virtue of provision of this specific nozzle, the blowing fluid can be dispersed uniformly in the molten resin and the efficiency of mixing and agitating the resin can be improved, with the result that non-uniform formation of bubbles can be prevented. If the D/H ratio of the nozzle 3 is outside the above-mentioned range, the blowing fluid flows predominantly along walls of the screw, flight and cylinder, and therefore, the amount of the blowing fluid dispersed into the molten resines decreased, resulting in prevention of uniform blowing. Furthermore, gas is filmily formed between the wall of the screw, flight or cylinder and the molten resin, causing an undesired phenomenon of slippage of the resin. Therefore, sufficient mixing of the molten resin cannot be expected.

This nozzle having a thin hole 12 is, as is shown in FIG. 6 as its standard form, screwed in the open end of the surface of the screw 1 or of the flight 10 and is welded at an appropriate height.

Figure 7:
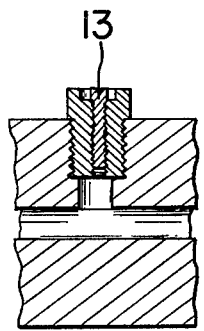
Figure 8:
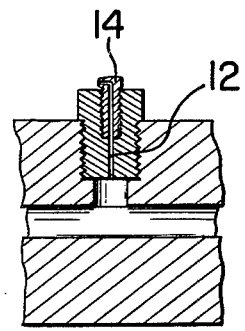

FIG. 7 shows an embodiment of a device in which a thin hole 12 has a stopper 13 for prevention of inflow of resin. FIG. 8 shows an embodiment of a nozzle which has a stopper 14 with a this hole being opened in the horizontal direction.

Figure 9:
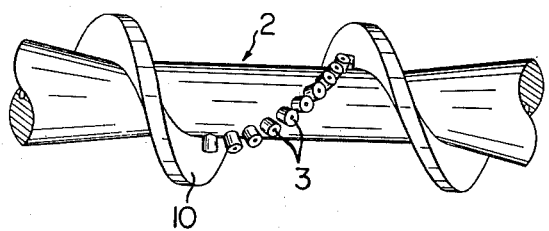
FIG. 9 shows a plurality of nozzles disposed in a line on the screw surface.

It is preferred that, as is illustrated in FIG. 1, a plurality of nozzles are disposed around the periphery of the screw 1 at different positions, or as shown in FIG. 9, a plurality of nozzles are disposed to project in the direction opposite to the direction of the flight in order to have more effective mixing. It is also possible that, as is shown in FIG. 2, nozzles are disposed on the both the side faces of the flight in such a manner that they are projected in the direction of the flight or in the direction opposite thereto.

In this invention, better results are obtained when a part of the flight 10 is cut off and one or more nozzles 3 are projected from the surface of the screw at this cut off portion. By so doing the injection pressure of the blowing fluid can be less fluctuant. This preferred embodiment is illustrated in FIG. 3.

The direction of projection of the nozzle 3 may be either vertical or inclined, and the projection direction is determined appropriately depending on the kind of the polyolefin resin used, the rotation rate of the screw and the like.

Not only an inert gas chlorofluoro hydrocarbon but also an organic solvent such as xylene, toluene and dodecylbenzene is injected from the nozzle as well as the blowing fluid. In the case of an organic solvent, the effect of reducing the melt viscosity of the molten polymer can be attained. Further, it is possible to inject an inert gas such as mentioned above simultaneously with the organic solvent.

The operation of the equipment will now be illustrated.

A resin such as polyethylene charged in a hopper 7 is at first introduced into the extruder and transported therein by means of the screw 1 while being molten and mixed. When the molten and mixed resin arrives at a low pressure zone 2 of the extruder, a blowing fluid kept in the compressed state by means of a compressor is injected into the molten resin from nozzles 3 mounted in the projecting manner on the surface of the screw 1 or the side face of the flight 10, through a pipe 6, a rotary joint 5 and a blowing fluid passage 4.

The compressor to be used for injection of the blowing fluid is equipped with a bombe, (compressed air tank), a metering pump and a rotary joint, and the fluid is always controlled up to maximum pressure about 200 to 300 Kg/cm$^2$, preferably 50 Kg/cm$^2$, by the compressor. The gas contained in the bombe passes through the compressor and is injected into the extruder by means of a metering pump in proportion to the stroke of the metering pump. The amount of the gas so supplied by means of the metering pump is such that it is slightly larger than the amount necessary for attaining the prescribed injection pressure. In order to ensure the quantitative injection of the gas, it is preferred that the volume of the gas passage in the perforated central portion of the screw is extremely reduced.

In the equipment of this invention, since the D/H ratio of the nozzle is adjusted within a range of from 0.1 to 2.0, the blowing fluid is prevented from flowing along the screw flight or cylinder surface, and it is uniformly dispersed into the molten resin. Further, turbulent flows are formed in the molten resin by an activity of such nozzle and the resin is sufficiently mixed.

As illustrated hereinabove, the equipment of this invention is characterized in that a projection nozzle having a specific height-diameter relation is mounted at a specific position in the low pressure zone of the extruder screw and a blowing fluid is injected from the screw side toward the molten resin. By dint of this characteristic feature, in the equipment of this invention the blowing fluid can be mixed and dispersed more stably and uniformly into the molten resin than in the conventional equipment, injection from the cylinder of the extruder, and therefore, uniform blowing state can be attained in the foamed resin layer and the thickness of the foamed resin insulating layer can be much reduced as compared with the case of the conventional equipment. Furthermore, when the equipment of this invention is employed, the speed of the high temperature extrusion operation can be much more increased than in the conventional method using a chemical blowing agent. In the foamed layer of a foamed polyolefin insulated wire manufactured by the equipment of this invention has independent cells having a size of 10 to 20 micron which are uniformly dispersed in the foamed layer.

In this invention, various coating and blowing methods such as mentioned below can be adopted, and a suitable method is chosen depending on the kind of an insulation-constituting resin.

1. In case a resin of alow melt viscosity is employed, a pellet of resin is forwarded from the hopper, and a blowing fluid is directly injected under pressure from a nozzle mounted on the blowing fluid passage in the low pressure zone of the screw and dispersed into the resin.

2. A resin powder and a chemical blowing agent are fed from the hopper, an organic solvent is injected from nozzles mounted on the blowing fluid passage, and the blowing of the resin is accomplished by the chemical blowing agent and the organic solvent in combination. In this case the melt viscosity of the resin in the cylinder can be reduced by an action of the organic solvent, and the coating operation can be accomplished at a very high speed.

3. In case a resin having a high melt viscosity and hence, a poor extrusion processibility of coating on a fine conductor having a diameter of about 0.5 mm, powdery high density polyethylene and an organic solvent are fed from the hopper to thereby reduce the viscosity of the melt, enable high speed extrusion and simultaneously make bubbles finer. Furthermore, a gas or liquefied gas directly injected from nozzles mounted on the fluid passage.

In case a conductor having a relatively large diameter (2.2 mm) is employed, the melt viscosity is not necessary to reduce (see experimental results shown in Table 3 given below).

Of the abovementioned methods (1) and (3) are preferably applied to production of a foamed insulation of a coaxial cable of a low loss to be used in a high frequency wave band region. In this case, not only a polyolefin but also all of plastics of a low loss such as polystyrene can be used as the low loss insulation. In general, the thickness of the foamed insulation is 3.0 to 4.0 mm, and the insulation thickness, i.e., the outer diameter of the insulation, can be reduced depending on the degree of expansion and the degree of dielectric loss; therefore, reduction of the manufacturing coat of cables can be accomplished.

In conducting the foregoing methods, it is possible to incorporate in the resin a minute amount of a blowing nucleating agent such as an complex of a higher fatty acid with a metal, powdery zinc fumed silica, organic blowing agent and powdery glass. In this case, the gas adheres around the periphery of the nucleating agent and agglomeration of the gas alone is prevented, whereby bubbles in the insulation can be made uniform and the low loss can be maintained. As a result, the mechanical strength can be increased in the foamed layer of a lessened thickness and properties can be further improved in the resulting insulated wire.

Advantages of this invention over the conventional techniques will now be illustrated more specifically by reference to Examples.

EXAMPLE 1

A foamed polyethylene insulated wire was prepared by employing an extrusion apparatus shown in FIG. 1.

High density polyethylene (Hi-zex 5100 LP manufactured by Mitsui Petrochemical) and a blowing agent of the azodicarbonamide type (manufactured by Eiwa Chemical) were fed from a hopper, and xylene was injected at a pressure of about 32 kg/cm$^2$ into the high density polyethylene from 2 nozzles (D/H=about 0.7, D=5mm, H=7mm) mounted at the open end of a blowing fluid passage, to thereby reduce the melt viscosity of the high density polyethylene. In this manner, the high speed extrusion foaming coating was run at a speed of 1,000 m per minute.

Properties of the so obtained foamed polyethylene insulated wires are shown in Table 1. The parenthesized values are those of comparative samples obtained by employing nozzles in which the D/H ratio was 0.

Table 1

| Item | Sample 1 (D/H=0.7) | Sample 2 (D/H=0.7) |
| --- | --- | --- |
| diameter of conductor (mm) | 0.4 | 0.65 |

Table 1-Continued

| Item | Sample 1 (D/H=0.7) | Sample 2 (D/H=0.7) |
| --- | --- | --- |
| thickness of insulating layer (mm) | 0.1 | 0.15 |
| expansion rate (%) | 20 (20) | 25 (25) |
| tensile load (Kg) | 0.41 (0.38) | 0.64 (0.52) |
| elongation (%) | 350 (230) | 470 (210) |
| abrasion test (times) | 170 (130) | 350 (230) |
| adhesion strength (Kg) | 0.7 (0.8) | 1.6 (1.5) |
| time (hr) before formation of cracks | 1000<(1000<) | 1000<(1000<) |

The abrasion characteristics (abrasion test of the coating), the adhesion strength and the time before formation of cracks were determined by the following methods. In subsequent Examples, these properties were determined by the same methods.

Abrasion Characteristics

A sample wire was placed on a plane base, and a polishing metal rod of a diameter of 2 mm was disposed vertically to the base in the state having a contact with the sample wire. Thus, the sample was rubbed and contacted with the metal rod at a sliding distance of 1 cm with 60 reciprocations per minute under a contact load of 400 g, and the frequency of the rubbing contacts required for mechanical fracture of the foamed insulation of the sample wire was measured.

Adhesion Strength

An insulation was removed at both end protions of a sample wire to expose the core conductor while leaving the central portion of 25 cm unexposed. One end of the sample was passed through a hole of a stop plate. The hole of the stop plate was so perforated that the core wire was freely passable therethrough but the insulation-coated portion of the sample could not pass through the hole. Said exposed end of the sample passed through the stop plate was pulled at a rate of 100 mm per minute. The maximum pulling load under which the coating could resist the pulling was measured, and the adhesion strength was expressed by the so measured value of the maximum load.

Time before Formation of Cracks

A sample wire was bent and wound on a rod of a diameter same as the outer diameter of the sample wire and maintained at 100°C. The time for which the sample was kept in this state without formation of cracks was measured.

A plurality of insulated wires of the above sample 2 were gathered to form a telecommunication cable (68 mm outer diameter; 0.65 × 1000P). The properties of the so formed telecommunication cable are as follows:

mutual capacitance: 50.3 nF/Km
capacitance unbalance within quad SS(PF/150m):
    45 (maximum),
    10.5 (average)
dielectric strength (under 500 V for 1 minute):good

EXAMPLE 2

A foamed polyethylene insulated wire was prepared in the same manner as in Example 1 except that an extruder having 2 nozzles of a D/H ratio of about 0.7 mounted on the side face of the flight, such as shown in FIG. 2, was employed. Properties of the resulting insulated wire are shown in Table 2.

Table 2

|  | Sample 1 of this invention | Comparative sample of D/H of 0 | Sample 2 of this invention | Comparative sample of D/H of 0 |
| --- | --- | --- | --- | --- |
| diameter of conductor(mm) | 0.5 | 0.5 | 0.9 | 0.9 |
| thickness of insulation(mm) | 0.12 | 0.12 | 0.22 | 0.22 |
| expansion rate (%) | 25 | 25 | 30 | 30 |
| tensile load (Kg) | 0.42 | 0.28 | 1.4 | 0.8 |
| elongation(%) | 372 | 270 | 461 | 240 |
| abrasion test (times) | 230 | 205 | 410 | 197 |
| adhesion strength (Kg) | 1.5 | 1.4 | 2.2 | 1.8 |
| time (hr) before formation of cracks | 1000< | 1000< | 1000< | 1000< |

A telecommunication cable (69 mm outer diameter; 0.5 × 1800 P) was prepared by gathering a plurality of insulated wires of the above sample 1. Properties of the so prepared calbe are as follows:

mutual capacitance: 50.6 nF/Km
capacitance unbalance within quad SS(PF/150m):
73 (maximum)
19.0 (average)
dielectric strength (under 500 V for 1 minute):good

EXAMPLE 3

An insulated wire having a foamed layer of a low loss was prepared with use of an extruder such as illustrated in FIG. 1. Low density polyethylene having a melt index of 0.3 was fed from a hopper, and nitrogen gas was passed through a blowing fluid passage of the screw and projected from 2 nozzles of a D/H ratio of about 0.7 mounted on the screw surface, whereby an insulating layer having uniform and fine pores was obtained. Properties of the so obtained foamed resin insulated wire are shown in Table 3.

Table 3

|  | Sample 1 | Sample 2 |
| --- | --- | --- |
| diameter of conductor (mm) | 0.5 | 2.2 |
| thickness of insulating layer (mm) | 0.75 | 3.9 |
| expansion rate (%) | 50 | 50 |
| tensile load (Kg) | 0.35 (0.24) | 0.55 (0.4) |
| elongation (%) | 250 (110) | 300 (130) |
| adhesion strength (Kg) | 15 (11) | 20 (22) |
| electric properties (tan δ) | $0.3 \times 10^{-4}$ | $0.4 \times 10^{-4}$ |

The parenthesized values are those of comparative samples prepared with use of nozzles of a D/H ratio of 0.

What is claimed is:

1. Extruder apparatus for preparing a foamable plastic mass, particularly suitable for use as insulation for electrical wires, comprising a housing defining a generally tubular channel through which said plastic mass may be flowed, screw means having internal flow conduit means formed therein revolvably positioned to longitudinally extend within said channel for defining a flow gap therebetween through which said mass may flow, means for injecting a propellant fluid under pressure into said internal flow conduit means, and nozzle means in flow communication between said internal flow conduit means and said flow gap for introducing said propellant fluid into said flow gap, said channel and said screw means being configured to define said flow gap to include a higher pressure zone and a lower pressure zone with said nozzle means being located on said screw member to extend into communication with said flow gap only within said lower pressure zone.

2. Apparatus according to claim 1 wherein said nozzle means comprise a projection height by which said nozzle means extend into said flow gap and a diameter, with the ratio of said projection height to said diameter being within a range of about 0.1 to 2.0.

3. Apparatus according to claim 2 wherein said diameter of said nozzle means is within a range of about 3 to 10 mm.

4. Apparatus according to claim 2 wherein said range is between 0.5 to 1.0.

5. Apparatus according to claim 1 wherein said propellant fluid is injected into said internal flow conduit means at a maximum pressure between about 220 to 300 Kg/cm$^3$.

6. Apparatus according to claim 1 wherein said screw means and said tubular channel are configured to be generally concentrically extending about a substantially common longitudinal axis and wherein said nozzle means comprise a plurality of nozzles each defining a flow path for said propellant fluid which extends substantially perpendicularly to said longitudinal axis.

7. Apparatus according to claim 1 wherein said screw means and said tubular channel are configured to be generally concentrically extending about a substantially common longitudinal axis and wherein said nozzle means comprise a plurality of nozzles each defining a flow path for said propellant fluid which extends substantially obliquely to said longitudinal axis.

8. Apparatus according to claim 1 wherein said screw means comprise a generally cylindrical outer surface having a screw member helically wound thereabout, said screw member having a pair of opposed surfaces facing forwardly and rearwardly, respectively, of the direction of flow of said plastic mass through said flow gap, and wherein said nozzle means are configured to open into said flow gap through at least one of said opposed surfaces.

9. Apparatus according to claim 8 wherein said nozzle means open from said rearwardly facing surface.

10. Apparatus according to claim 8 wherein said nozzle means open from said forwardly facing surface.

11. Apparatus according to claim 8 wherein said nozzle means open from both said rearwardly and forwardly facing surfaces.

12. Apparatus according to claim 8 wherein said screw member extends discontinuously along said cylindrical outer surface, with the portion of said cylindrical outer surface extending through said lower pressure zone being at least partially devoid of said screw member and wherein said nozzle means extend into said flow gap through said portion of said cylindrical outlet surface devoid of said screw member.

13. Apparatus according to claim 8 wherein said nozzle means comprise a plurality of nozzles located to extend through said cylindrical outer surface in a helical path extending generally transversely of the helical path of said screw member.

* * * * *